United States Patent
Jeon (10) Patent No.: US 12,503,077 B2
(45) Date of Patent: Dec. 23, 2025

(54) VEHICLE ELECTRIC POWER MANAGEMENT SYSTEM

(71) Applicant: SUBARU CORPORATION, Tokyo (JP)

(72) Inventor: Daeho Jeon, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 137 days.

(21) Appl. No.: 18/386,296

(22) Filed: Nov. 2, 2023

(65) Prior Publication Data
US 2024/0166150 A1     May 23, 2024

(30) Foreign Application Priority Data
Nov. 17, 2022   (JP) ................................ 2022-184293

(51) Int. Cl.
*B60R 25/40*     (2013.01)
*B60R 16/03*     (2006.01)
(Continued)

(52) U.S. Cl.
CPC ............ *B60R 25/403* (2013.01); *B60R 16/03* (2013.01); *B60R 16/0231* (2013.01); *B60R 25/24* (2013.01)

(58) Field of Classification Search
CPC ............ B60R 25/24–248; B60R 25/31; B60R 25/40–406; B60R 2325/20–205; G07C 5/008
See application file for complete search history.

(56) References Cited

U.S. PATENT DOCUMENTS

2009/0224876 A1\*   9/2009   McCall .............. G07C 9/00309
                                                                                             340/7.38
2019/0120195 A1\*   4/2019   King ...................... B60R 16/03
(Continued)

FOREIGN PATENT DOCUMENTS

CN       106184070 A   \*   12/2016         B60R 16/0232
CN       111252032 A   \*   6/2020           B60Q 1/323
(Continued)

OTHER PUBLICATIONS

English machine translation of CN111252032A published Jun. 9, 2020 (Year: 2020).\*
(Continued)

*Primary Examiner* — Rexford N Barnie
*Assistant Examiner* — David A Shiao
(74) *Attorney, Agent, or Firm* — TROUTMAN PEPPER LOCKE LLP (57) ABSTRACT

A vehicle electric power management system configured to manage electric power for a vehicle includes a first controller and a communicator. The first controller switches an operation state of each of in-vehicle units or communication between the in-vehicle units in the vehicle. The communicator communicates with a mobile device to be carried by an occupant of the vehicle. The mobile device includes a sensor configured to perform a detection of vibration or acceleration. When determining that a non-detection period of time exceeds a first predetermined period of time based on a result of the detection performed by the sensor, the first controller switches the operation state of each of the in-vehicle units or the communication between the in-vehicle units from a normal mode to a sleep mode. The non-detection period of time is a period of time in which the vibration or the acceleration is undetected.

4 Claims, 4 Drawing Sheets

(51) Int. Cl.
  *B60R 16/023* (2006.01)
  *B60R 25/24* (2013.01)

(56) References Cited

U.S. PATENT DOCUMENTS

2020/0084584 A1\* 3/2020 Yamaguchi .......... H04B 1/3822
2020/0086829 A1\* 3/2020 Wall ..................... B60R 25/245
2022/0169207 A1\* 6/2022 Moeller ................ B60R 25/245

FOREIGN PATENT DOCUMENTS

| CN | 112109646 | A | \* | 12/2020 | ............. B60R 16/03 |
| CN | 114228642 | A | \* | 3/2022 | ......... B60R 16/0231 |
| CN | 114771460 | A | \* | 7/2022 | ............. B60R 25/20 |
| JP | 2010-53632 | A | | 3/2010 | |

OTHER PUBLICATIONS

English machine translation of CN114228642A published Mar. 25, 2022 (Year: 2022).\*
English machine translation of CN114771460A published Jul. 22, 2022 (Year: 2022).\*
English machine translation of CN106184070A published Dec. 7, 2016 (Year: 2016).\*
English machine translation of CN112109646A published Dec. 22, 2020 (Year: 2020).\*

\* cited by examiner

VEHICLE ELECTRIC POWER MANAGEMENT SYSTEM

CROSS-REFERENCE TO RELATED APPLICATION

The present application claims priority from Japanese Patent Application No. 2022-184293 filed on Nov. 17, 2022, the entire contents of which are hereby incorporated by reference.

BACKGROUND

The disclosure relates to a vehicle electric power management system configured to manage electric power for a vehicle.

Recently, many vehicles use a smart key system. In the smart key system, a vehicle and a mobile device carried by an occupant perform wireless communication to transmit and receive an authentication code. If the authentication code that has been transmitted from the mobile device and received on a vehicle side is an authentication code specific to the vehicle, an operation such as unlocking a door or starting an engine is allowed.

In addition, there is a technique that suppresses a decrease in life of a battery of a mobile wireless communication device for a vehicle including a smart key system. For example, see Japanese Unexamined Patent Application Publication (JP-A) No. 2010-053632. In this technique, when a state of a mobile device is detected by a mobile device detection sensor, a control mode of a controller is switchable from a low electric power consumption control mode to a normal control mode. This prevents the controller of the mobile wireless communication device from operating unless the wireless mobile communication device is carried by an occupant. It is therefore possible to suppress an unnecessary decrease in life of the battery of the wireless mobile communication device.

SUMMARY

An aspect of the disclosure provides a vehicle electric power management system configured to manage electric power for a vehicle. The vehicle electric power management system includes a first controller and a communicator. The first controller is configured to switch an operation state of each of in-vehicle units in the vehicle or an operation state of communication between the in-vehicle units in the vehicle. The communicator is configured to communicate with a mobile device to be carried by an occupant of the vehicle. The mobile device includes a sensor configured to perform a detection of vibration or acceleration. The first controller is configured to, when determining that a non-detection period of time exceeds a first predetermined period of time based on a result of the detection performed by the sensor, switch the operation state of each of the in-vehicle units or the operation state of the communication between the in-vehicle units from a normal mode to a sleep mode. The non-detection period of time is a period of time in which the vibration or the acceleration is undetected.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Regarding a technique disclosed in JP-A No. 2010-053632, there is room for improvement in terms of a reduction in electric power consumption in a vehicle.

For example, the technique disclosed in JP-A No. 2010-053632 is to reduce a consumption amount of a battery of a wireless mobile communication device in a smart key system. Therefore, the technique disclosed in JP-A No. 2010-053632 does not take into consideration a reduction in electric power consumption on a vehicle side in the smart key system.

When an occupant finishes driving a vehicle, the occupant turns off a power supply of the vehicle, for example, by pressing an engine switch, and gets off the vehicle by opening and closing a door. Thereafter, the occupant moves away from the vehicle together with a smart key. In response to detection of such a situation, the vehicle turns off a communication system coupling units to each other, and the vehicle as a whole transitions to a sleep mode.

However, the communication system in the vehicle may not be turned off. This prevents the vehicle as a whole from transitioning to the sleep mode, and therefore hinders a reduction in electric power consumption. Accordingly, a battery can run out.

It is desirable to provide a vehicle electric power management system that makes it possible to reduce electric power consumption of a vehicle after an occupant gets off the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

With reference to the accompanying drawings, a detailed description is provided below of a vehicle 10 including a vehicle electric power management system 11 according to an example embodiment of the disclosure. In the following description, communication inside the vehicle 10 may sometimes be referred to as "in-vehicle communication", and communication between the vehicle 10 and a mobile device 13 may sometimes be referred to as "vehicle-outside communication".

Figure 1:
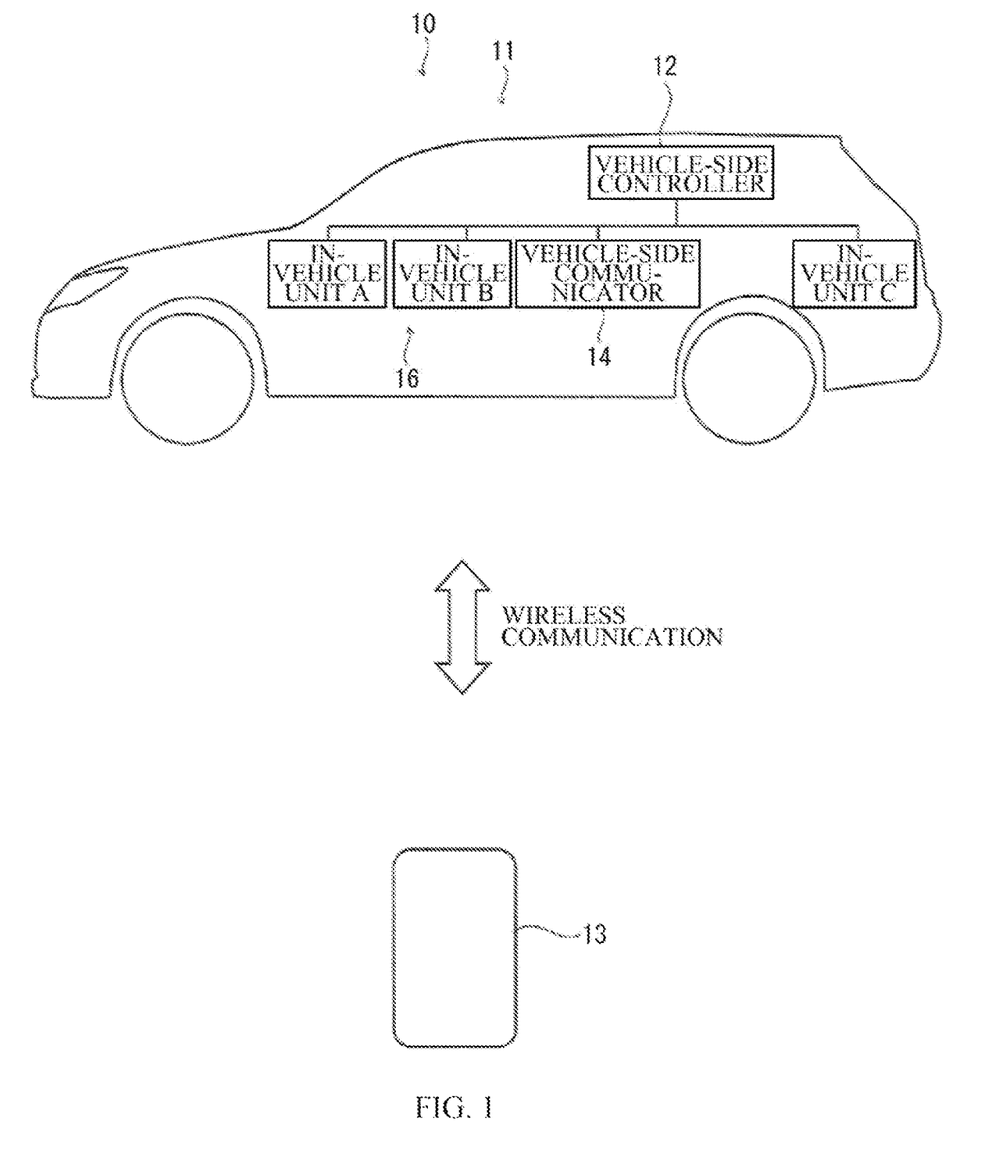
FIG. 1 is a schematic diagram illustrating a vehicle including a vehicle electric power management system according to one example embodiment of the disclosure.

FIG. 1 is a schematic diagram illustrating the vehicle 10 including the vehicle electric power management system 11.

The vehicle 10 may be, for example but not limited to, an engine vehicle, an electric vehicle (EV), a hybrid electric vehicle (HEV), or a plug-in hybrid electric vehicle (PHEV).

The vehicle electric power management system 11 may be a system configured to manage electric power for the vehicle 10. For example, the vehicle electric power management system 11 may include a vehicle-side controller 12 and a vehicle-side communicator 14. The vehicle-side controller 12 may switch an operation state of each of in-vehicle units 16. The vehicle-side communicator 14 may perform vehicle-outside communication with the mobile device 13. The mobile device 13 may be carried by an occupant. As will be described later, after the occupant gets off the vehicle 10, the vehicle electric power management system 11 may autonomously switch the operation state of each of the in-vehicle units 16 and an operation state of a network coupling the in-vehicle units 16 to each other from a normal mode to a sleep mode, in accordance with a state of the mobile device 13. This may reduce electric power consumption of the vehicle 10 after the occupant gets off the vehicle 10, preventing a battery from running out. In one embodiment, the vehicle-side controller 12 may serve as a "first controller". In one embodiment, the vehicle-side communicator 14 may serve as a "communicator".

The vehicle 10 may include the in-vehicle units 16. The in-vehicle units 16 may be coupled to each other via the vehicle-side controller 12 serving as a gateway. Here, in-vehicle units A to C are illustrated. The in-vehicle units 16 may include the vehicle-side communicator 14. The vehicle-side communicator 14 may be a component device configured to communicate with the mobile device 13 which will be described later. In addition to the vehicle-side communicator 14, the in-vehicle units 16 may include, for example but not limited to, a power train unit, a braking unit, a steering unit, a driving assistance unit, and a navigation unit. Each of the in-vehicle units 16 and the vehicle-side controller 12 may be coupled to each other, for example, by a control are network (CAN).

In one example, the vehicle-side controller 12 may be provided for each of the units and an operation system. For example, a smart ECU may be provided to control a smart key system. In the following description, controllers provided for the respective units and the operation system may collectively be referred to as the "vehicle-side controller 12".

The mobile device 13 may be a device to be carried by an occupant who drives the vehicle 10. For example, the mobile device 13 may be a smart key included in the smart key system. In one example, one function of a smartphone may serve as the mobile device 13.

Figure 2:
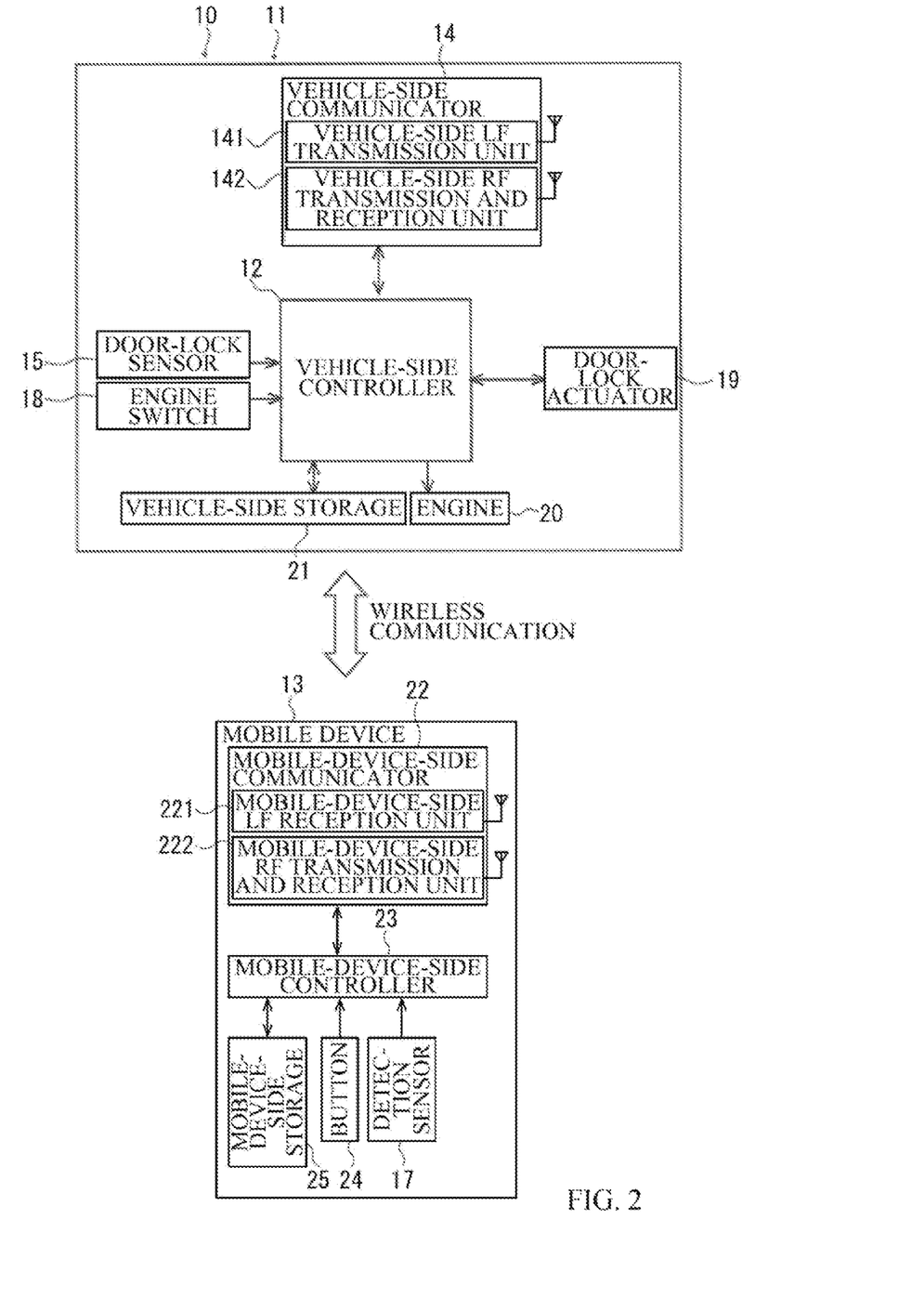
FIG. 2 is a coupling diagram illustrating the vehicle including the vehicle electric power management system according to one example embodiment of the disclosure.

FIG. 2 is a coupling diagram illustrating the vehicle 10 including the vehicle electric power management system 11.

The vehicle 10 may include, for example, the vehicle-side controller 12, the vehicle-side communicator 14, a door-lock sensor 15, an engine switch 18, a vehicle-side storage 21, an engine 20, and a door-lock actuator 19.

The vehicle-side controller 12 may include a computer including, without limitation, a central processing unit (CPU), a read-only memory (ROM), a random-access memory (RAM), and a timer. The vehicle-side controller 12 may execute various processes to control the vehicle 10 and the vehicle electric power management system 11. The vehicle-side controller 12 may control each of component devices in the vehicle 10 based on input information from devices including, without limitation, the vehicle-side communicator 14 and various sensors included in the vehicle 10. The vehicle-side controller 12 may execute an operation, which will be described later, based on a program read from the vehicle-side storage 21 which will be described later.

The vehicle-side communicator 14 may include a vehicle-side low frequency (LF) transmission unit 141 and a vehicle-side radio frequency (RF) transmission and reception unit 142.

The vehicle-side LF transmission unit 141 may transmit an ID request signal to the mobile device 13. The ID request signal may be an LF signal.

The vehicle-side RF transmission and reception unit 142 may transmit an ID request signal that is an RF signal, may receive an ID signal (a response signal) from the mobile device 13, and may perform any other operation. In such a manner, the vehicle 10 may perform mutual vehicle-outside communication with the mobile device 13 via the vehicle-side LF transmission unit 141 and the vehicle-side RF transmission and reception unit 142. The vehicle-side communicator 14 and a mobile-device-side communicator 22 performing the vehicle-outside communication may allow for measurement of a distance from the vehicle 10 to the mobile device 13 when the mobile device 13 is present outside the vehicle 10.

The door-lock sensor 15 may include, for example, a touch sensor or any other sensor. The touch sensor may be provided at a location such as a door handle of a vehicle door outside the vehicle 10. The door-lock sensor 15 may sense an operation of the occupant touching a predetermined part, and may thereby transmit a signal to the vehicle-side controller 12. The predetermined part may be, for example, the door handle. The vehicle-side controller 12 may control the door-lock actuator 19 based on the received signal.

The engine switch 18 may be a switch to be pressed, for example, when the occupant starts or stops the engine 20.

The vehicle-side storage 21 may include, for example, an integrated circuit (IC) chip. The vehicle-side storage 21 may hold a program that allows for execution of a predetermined operation to be performed by the vehicle 10.

The door-lock actuator 19 may be an actuator configured to lock or unlock the vehicle door. The door-lock actuator 19 may include, for example, a motor or any other component. The motor may be configured to drive a lock mechanism and an unlock mechanism for the vehicle door.

The mobile device 13 may include, for example, the mobile-device-side communicator 22, a mobile-device-side controller 23, a mobile-device-side storage 25, a button 24, and a detection sensor 17. The mobile device 13 may be to be carried by the occupant who drives the vehicle 10. In one embodiment, the mobile-device-side controller may serve as a "second controller". In one embodiment, the detection sensor 17 may serve as a "sensor".

The mobile-device-side communicator 22 may include, for example, a mobile-device-side LF reception unit 221 and a mobile-device-side RF transmission and reception unit 222.

The mobile-device-side LF reception unit 221 may receive the ID request signal, which is the LF signal, transmitted from the vehicle 10.

The mobile-device-side RF transmission and reception unit 222 may receive the ID request signal, which is the RF signal, transmitted from the vehicle 10 side, and may transmit an ID signal that is an RF signal.

The mobile-device-side storage 25 may include, for example, an IC chip. The mobile-device-side storage 25 may hold a program that allows for execution of a predetermined operation to be performed by the mobile device 13.

The mobile-device-side controller 23 may include a computer including, without limitation, a CPU, a ROM, a RAM, and a timer. The mobile-device-side controller 23 may execute various processes to control the mobile device 13. The mobile-device-side controller 23 may execute an operation which will be described later, based on a program read from the mobile-device-side storage 25. The mobile-device-side controller 23 may control the mobile-device-side communicator 22, and when the ID request signal is received from the vehicle 10 side, automatically cause the ID signal to be transmitted to the vehicle 10 side. The vehicle-side controller 12 of the vehicle 10 may compare the ID signal transmitted from the mobile device 13, i.e., an ID code of the mobile device 13, with an ID code in the vehicle-side storage 21 of the vehicle 10 to identify the mobile device 13.

The button 24 may be, for example but not limited to, a lock button and an unlock button configured to remotely perform operations of locking and unlocking the vehicle door. The occupant pressing the button 24 may cause a signal to be transmitted from the mobile-device-side communicator 22 to the vehicle-side communicator 14 of the vehicle 10. The signal may be for locking or unlocking the vehicle door.

The detection sensor 17 may be a sensor that detects vibration or acceleration acting on the mobile device 13. For example, the detection sensor 17 may substantially constantly detect the vibration or the acceleration acting on the mobile device 13, and may send a signal to the mobile-device-side controller 23. The signal may indicate whether vibration or acceleration is acting on the mobile device 13.

A description will be provided below of an operation of the smart key system in the vehicle 10, the vehicle electric power management system 11, and the mobile device 13 having the respective configurations described above, after driving of the vehicle 10 is finished.

First, after the vehicle 10 stops, for example, when the vehicle 10 arrives at a destination, the occupant may press the engine switch 18 to stop the engine 20 and an unillustrated vehicle driving motor. That is, the occupant may press the engine switch 18 to turn off a vehicle power supply.

Thereafter, the occupant may open and close the door to get off the vehicle 10. The occupant may operate the door-lock sensor 15 to cause the door-lock actuator 19 to operate, and may thereby lock the door.

Thereafter, when the occupant carrying the mobile device 13 moves away from the vehicle 10 by a certain distance or more, the vehicle-side controller 12 may switch the operation state of each of the in-vehicle units 16, etc. from the normal mode to the sleep mode. The operation state of each of the in-vehicle units 16, etc. being switched from the normal mode to the sleep mode may reduce an amount of electric power consumption of the vehicle 10 as a whole. This helps to prevent the battery of the vehicle 10 from running out.

In the vehicle electric power management system 11 and the vehicle 10 having the above-described configurations and configured to perform the above-described operations, even if the driving is finished and the occupant moves away from the vehicle 10, the operation state of each of the in-vehicle units 16 and the operation state of the in-vehicle communication may not be switched from the normal mode to the sleep mode in some cases. For example, the operation state of each of the in-vehicle units 16 and the operation state of the in-vehicle communication may not be switched from the normal mode to the sleep mode when the vehicle-outside communication malfunctions or when the in-vehicle units 16 malfunction. In the example embodiment, the vehicle electric power management system 11 may execute a control of forcefully switching the operation state of each of the in-vehicle units 16, etc. of the vehicle 10 from the normal mode to the sleep mode, even in such a case. This will be described below with reference to FIGS. 3 and 4.

Figure 3:
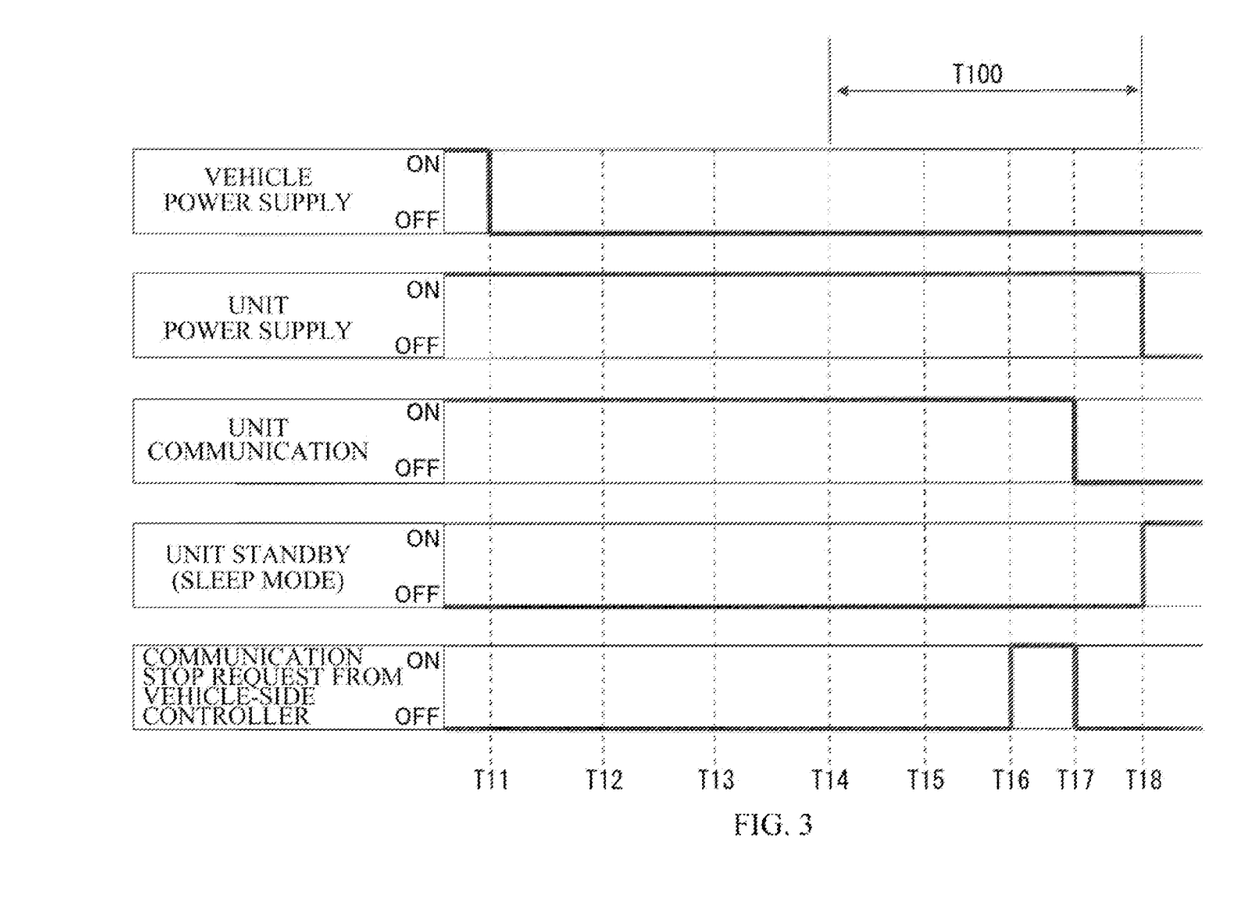
FIG. 3 is a timing chart illustrating an operation of the vehicle electric power management system according to one example embodiment of the disclosure.

FIG. 3 is a timing chart illustrating an operation to be performed by the vehicle electric power management system 11. In this example, when vibration or acceleration of a certain level or higher is not acting on the mobile device 13, the vehicle-outside communication between the vehicle 10 and the mobile device 13 may be disconnected, and when a disconnected state continues for more than a predetermined period of time set in advance, the vehicle-side controller 12 may switch the operation state of each of the in-vehicle units 16 from the normal mode to the sleep mode. An operation state of a controller area network (CAN) coupling the in-vehicle units 16 to each other may also be switched from the normal mode to the sleep mode. That is, the vehicle-side controller 12 may determine whether the vehicle 10 is in a vehicle unused state. Here, the vehicle unused state may refer to a state in which the vehicle 10 is not driven by the occupant for a while, for example, for several hours or more after the occupants gets off the vehicle 10.

The timing chart illustrated in FIG. 3 presents, from the top, an ON state and an OFF state of the vehicle power supply, an ON state and an OFF state of a power supply for the in-vehicle units 16, an ON state and an OFF state of the in-vehicle communication between the in-vehicle units 16, an ON state and an OFF state of unit standby (the sleep mode), and an ON state and an OFF state of a communication stop request from the vehicle-side controller 12. This similarly applies to FIG. 4 to be described later.

At a time T11, after the driving of the vehicle 10 is finished, the occupant may perform an operation such as pressing the engine switch 18 to stop, for example, the engine 20. This may turn off the vehicle power supply.

At a time T12, the occupant may open and close the door and thereby get off the vehicle 10.

At a time T13, the occupant who has got off the vehicle 10 may move away from the vehicle 10. At this time, the mobile device 13 carried by the occupant may also move away from the vehicle 10 together with the occupant.

At a time T14, for example, when the vehicle-side communicator 14 of the vehicle 10 and the mobile-device-side communicator 22 of the mobile device 13 perform the vehicle-outside communication and thereby detect that the distance of the mobile device 13 from the vehicle 10 has reached a certain distance or more, the vehicle-side controller 12 may switch the operation state of each of the in-vehicle units 16 from the normal mode to the sleep mode. That is, the vehicle-side controller 12 may turn off the in-vehicle units 16 and the in-vehicle communication between the in-vehicle units 16.

Here, for some reason, the operation state of each of the in-vehicle units 16 or the operation state of the in-vehicle communication between the in-vehicle units 16 may not be switched from the normal mode to the sleep mode in some cases. If such a state continues, the battery of the vehicle 10 can run out. In the example embodiment, the following operation may be executed to switch the operation state of each of the in-vehicle units 16, etc. from the normal mode to the sleep mode even if the above-described state is caused.

At a time T15, if the detection sensor 17 does not detect the vibration or the acceleration of the certain level or higher for a predetermined period of time or more, the mobile-device-side controller 23 may disconnect the communication between the mobile-device-side communicator 22 and the vehicle-side communicator 14.

At a time T16, the vehicle-side controller 12 may determine whether a predetermined period of time has elapsed since disconnection of the communication between the vehicle-side communicator 14 and the mobile-device-side communicator 22. The predetermined period of time may be, for example, 10 minutes. When the predetermined period of time elapses from the disconnection of the communication between the vehicle-side communicator 14 and the mobile-device-side communicator 22, the vehicle-side controller 12 may determine that the vehicle 10 is in the vehicle unused state, and may send the communication stop request. The vehicle unused state may be a state in which the occupant has no intention to use the vehicle 10. In this case, it may be the vehicle-side controller 12 that determines whether the vehicle 10 is in the vehicle unused state. This makes it possible to perform the determination regarding the vehicle unused state inside the vehicle 10. It is therefore possible to more reliably switch the operation state of each of the in-vehicle units 16, etc. from the normal mode to the sleep mode.

At a time T17, the vehicle-side controller 12 may turn off the in-vehicle communication between the in-vehicle units 16, for example, the CAN communication. This may reduce electric power used in the in-vehicle communication between the in-vehicle units 16 and thereby help to prevent the battery from running out.

At a time T18, the vehicle-side controller 12 may turn off the power supply for the in-vehicle units 16 and switch the operation state of each of the in-vehicle units 16 from the normal mode to the sleep mode. This may reduce electric power used in the operation of the in-vehicle units 16 and thereby help to prevent the battery from running out.

A period of time T100 may be a period of time from the time T14 to the time T18. The time T14 may be a time at which the operation state of each of the in-vehicle units 16 and the operation state of the in-vehicle communication between the in-vehicle units 16 are supposed to be switched from the normal mode to the sleep mode. The time T18 may be a time at which the vehicle electric power management system 11 according to the example embodiment forcefully switches the operation state of each of the in-vehicle units 16 and the operation state of the in-vehicle communication between the in-vehicle units 16 from the normal mode to the sleep mode. For example, the period of time T100 may be about 10 minutes. This makes it possible to, even when the operation state of each of the in-vehicle units 16 and the operation state between the in-vehicle units 16 are not switched from the normal mode to the sleep mode at the time T14, reduce electric power consumption of the in-vehicle units 16 and thereby help to prevent the battery of the vehicle 10 from running out.

Figure 4:
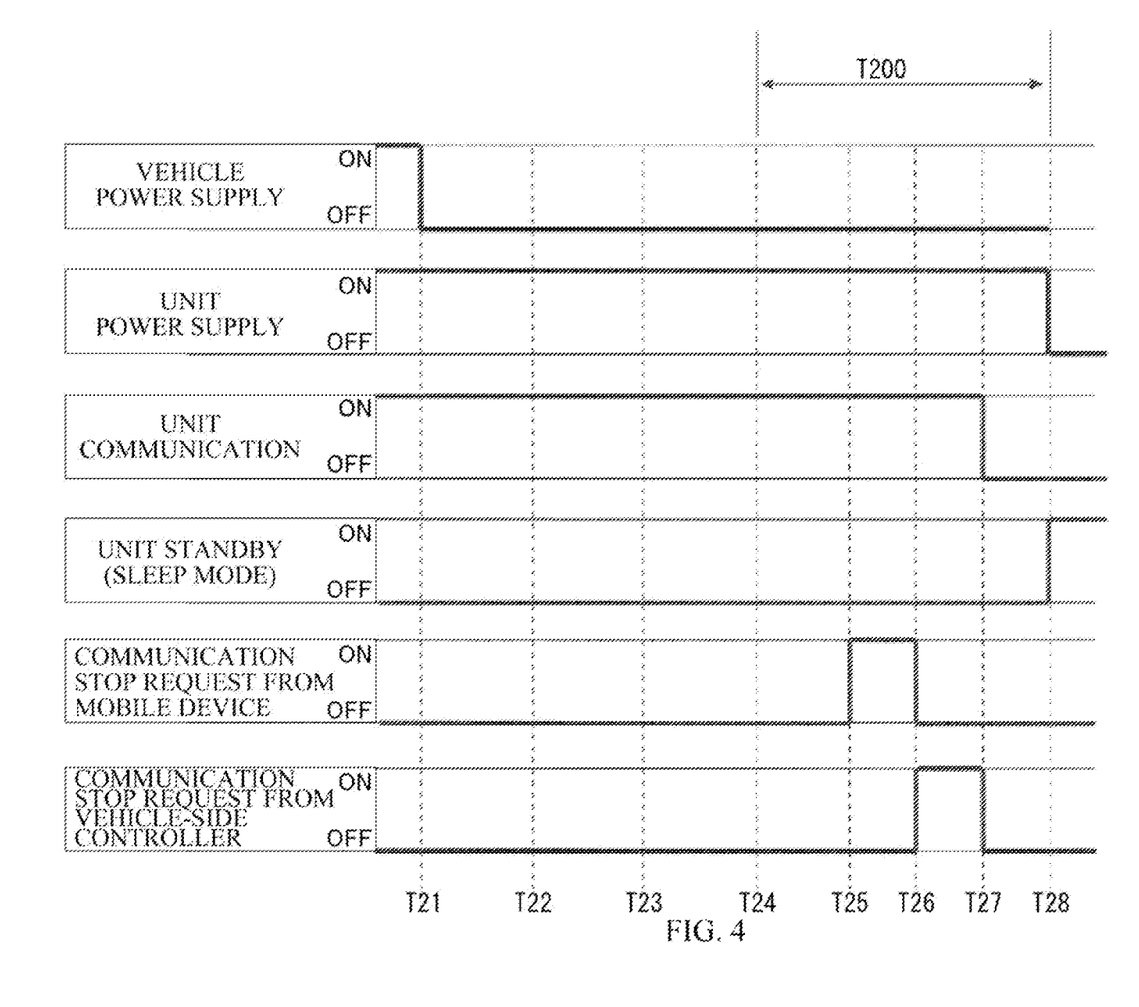
FIG. 4 is a timing chart illustrating an operation of a vehicle electric power management system according to one example embodiment of the disclosure.

FIG. 4 is a timing chart for describing an operation to be performed by the vehicle electric power management system 11 according to another example embodiment. An outline of the operation is as follows. In this example embodiment, when the detection sensor 17 of the mobile device 13 does not detect the vibration or the acceleration for a predetermined period of time or more, the mobile-device-side controller 23 may determine that the vehicle 10 is in the vehicle unused state. The predetermined period of time may be set in advance. Thereafter, the vehicle-side controller 12 may switch the operation state of each of the in-vehicle units 16 from the normal mode to the sleep mode. The vehicle-side controller 12 may also switch the operation state of the CAN coupling the in-vehicle units 16 to each other from the normal mode to the sleep mode substantially at the same time.

Operations from a time T21 to a time T24 may be similar to the above-described operations from the time T11 to the time T14, respectively.

At a time T25, if the detection sensor 17 does not detect the vibration or the acceleration of a certain level or higher for the predetermined period of time or more, the mobile-device-side controller 23 may determine that the vehicle 10 is in the vehicle unused state. The mobile-device-side controller 23 may transmit a request signal to the vehicle-side communicator 14 of the vehicle 10 via the mobile-device-side communicator 22 and the vehicle-side communicator 14. The request signal may be to switch the operation state of each of the in-vehicle units 16 and the operation state of the communication between the in-vehicle units 16 from the normal mode to the sleep mode. Further, to prevent the vehicle 10 from being stolen, the mobile-device-side controller 23 may stop the communication between the mobile-device-side communicator 22 and the vehicle-side communicator 14. Here, the predetermined period of time may be 10 minutes, for example.

At a time T26, the vehicle-side controller 12 may send the communication stop request based on the request sent from the mobile device 13 via the vehicle-side communicator 14. The communication stop request may be a request to stop the in-vehicle communication between the in-vehicle units 16.

Operations at a time T27 and a time T28 thereafter may be similar to the above-described operations at the time T17 and the time T18, respectively. That is, the vehicle-side controller 12 may turn off the unit communication and the power supply for each of the units to thereby switch the operation states thereof from the normal mode to the sleep mode. This may reduce the electric power consumption of the vehicle 10.

A period of time T200 may be a period of time from the time T24 to the time T28. The time T24 may be a time at which the operation state of each of the in-vehicle units 16 and the operation state of the communication between the in-vehicle units 16 are supposed to be switched from the normal mode to the sleep mode. The time T28 may be a time at which the vehicle electric power management system 11 according to the example embodiment forcefully switches the operation state of each of the in-vehicle units 16 and the operation state of the communication between the in-vehicle units 16 from the normal mode to the sleep mode. For example, the period of time T200 may be about 10 minutes. For example, when the vibration or the acceleration does not act on the mobile device 13 for a predetermined time or more, it may be highly possible that the mobile device 13 is placed or stored at a predetermined indoor location. Therefore, in such a situation, the mobile-device-side controller 23 may determine that the vehicle 10 is in the vehicle unused state, and the vehicle-side communicator 14 may switch the operation state of each of the in-vehicle units 16, etc. from the normal mode to the sleep mode in response thereto. This may reduce the electric power consumption of the in-vehicle units 16, and may thereby help to prevent the battery of the vehicle 10 from running out.

In the following, technical ideas derived from the above-described example embodiments are described together with effects thereof.

A vehicle electric power management system according to an example embodiment of the disclosure is a vehicle electric power management system configured to manage electric power for a vehicle. The vehicle electric power management system includes a first controller and a communicator. The first controller is configured to switch an operation state of each of in-vehicle units in the vehicle or an operation state of communication between the in-vehicle units in the vehicle. The communicator is configured to communicate with a mobile device to be carried by an occupant of the vehicle. The mobile device includes a sensor configured to perform a detection of vibration or acceleration. The first controller is configured to, when determining that a non-detection period of time exceeds a first predetermined period of time based on a result of the detection performed by the sensor, switch the operation state of each of the in-vehicle units or the operation state of the communication between the in-vehicle units from a normal mode to a sleep mode. The non-detection period of time is a period of time in which the vibration or the acceleration is undetected. According to the vehicle electric power management system of the example embodiment of the disclosure, switching the operation state of each of the in-vehicle units or the operation state of the communication between the in-vehicle units from the normal mode to the sleep mode when the non-detection period of time exceeds the first predetermined period of time makes it possible to prevent the in-vehicle units from unnecessarily continuing to be in the ON state and to thereby help to prevent an in-vehicle battery from running out.

In the vehicle electric power management system of the example embodiment of the disclosure, the mobile device may include a second controller. The second controller may be configured to, when determining that the non-detection period of time exceeds a second predetermined period of time, determine that the vehicle is in a vehicle unused state and send a signal to the communicator. The signal may indicate the vehicle unused state. The first controller may be configured to switch the operation state of each of the in-vehicle units or the operation state of the communication between the in-vehicle units from the normal mode to the sleep mode, based on the signal. According to the vehicle electric power management system of the example embodiment of the disclosure, determining the vehicle unused state by the second controller makes it possible to accurately detect the non-detection period of time and to reliably switch the operation state of each of the in-vehicle units or the operation state of the communication between the in-vehicle units from the normal mode to the sleep mode.

In the vehicle electric power management system of the example embodiment of the disclosure, the first controller may be configured to, when determining that the non-detection period of time exceeds the first predetermined period of time, determine that the vehicle is in a vehicle unused state and switch the operation state of each of the in-vehicle units or the operation state of the communication between the in-vehicle units from the normal mode to the sleep mode. According to the vehicle electric power management system of the example embodiment of the disclosure, determining the vehicle unused state by the first controller makes it possible to simplify the operation to be performed by the mobile device that is small in size.

In the vehicle electric power management system of the example embodiment of the disclosure, the mobile device may include a second controller. The second controller may be configured to, when determining that the non-detection period of time exceeds a second predetermined period of time, stop radio wave transmission from the mobile device to establish a disconnected state. The first controller may be configured to, when the disconnected state continues for more than a third predetermined period of time, determine that the vehicle is in the vehicle unused state. According to the vehicle electric power management system of the example embodiment of the disclosure, it is possible to determine the vehicle unused state by a simple determination method based on the disconnected state.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the vehicle-side controller 12 and the mobile-device-side controller 23 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the vehicle-side controller 12 and the mobile-device-side controller 23 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the vehicle-side controller 12 and the mobile-device-side controller 23 illustrated in FIG. 2.

The invention claimed is:

1. A vehicle electric power management system configured to manage electric power for a vehicle, the vehicle electric power management system comprising:
   a first controller configured to control an operation state of each of in-vehicle units in the vehicle and an operation state of communication between the in-vehicle units in the vehicle; and
   a communicator configured to communicate with a mobile device to be carried by an occupant of the vehicle, and
   the mobile device including a sensor configured to detect vibration or acceleration acting on the mobile device, and configured to stop communications with the first controller via the communicator to establish a disconnected state with the communicator in response to determining the vibration or acceleration being not acting on the mobile device for a first predetermined period of time, wherein
   the first controller is configured to, when determining that the disconnected state continues for a second predetermined period of time, turn off the communication between the in-vehicle units and switch the in-vehicle units from a normal mode to a sleep mode.

2. The vehicle electric power management system according to claim 1, wherein the first controller is configured to, when determining that the disconnected state continues for the second predetermined period of time, determine that the vehicle is in a vehicle unused state and switch the operation state of each of the in-vehicle units or the operation state of the communication between the in-vehicle units from the normal mode to the sleep mode.

3. The vehicle electric power management system according to claim 2, wherein
the mobile device comprises a second controller,
the second controller is configured to, when determining that the vibration or acceleration is not acting on the mobile device for the first predetermined period of time, stop radio wave transmission from the mobile device to the communicator to establish the disconnected state with the communicator, and
the first controller is configured to, when the disconnected state continues for more than a third predetermined period of time, determine that the vehicle is in the vehicle unused state and switch the operation state of each of the in-vehicle units or the operation state of the communication between the in-vehicle units from the normal mode to the sleep mode.

4. The vehicle electric power management system according to claim 1, wherein the first controller is configured to, when determining the distance of the mobile device from the vehicle has reached a predetermined distance or more, turn off the communication between the in-vehicle units and switch the in-vehicle units from the normal mode to the sleep mode.

* * * * *